United States Patent
Ni et al.

(10) Patent No.: US 9,889,587 B2
(45) Date of Patent: Feb. 13, 2018

(54) COMPOSITE RIBBED EXPANDED POLYSTYRENE PALLET AND MANUFACTURING METHOD THEREOF

(71) Applicant: Suzhou Kingpak Technology Co., Ltd., Suzhou, Jiangsu (CN)

(72) Inventors: Songzhou Ni, Jiangsu (CN); Wenbao Yu, Jiangsu (CN)

(73) Assignee: SUZHOU KINGPAK TECHNOLOGY CO., LTD., Suzhou (CN)

( * ) Notice: Subject to any disclaimer, the term of this patent is extended or adjusted under 35 U.S.C. 154(b) by 42 days.

(21) Appl. No.: 15/109,812

(22) PCT Filed: Dec. 14, 2015

(86) PCT No.: PCT/CN2015/097271
§ 371 (c)(1),
(2) Date: Jul. 5, 2016

(87) PCT Pub. No.: WO2017/049772
PCT Pub. Date: Mar. 30, 2017

(65) Prior Publication Data
US 2017/0239860 A1    Aug. 24, 2017

(30) Foreign Application Priority Data

Sep. 22, 2015   (CN) .......................... 2015 1 0605561

(51) Int. Cl.
*B65D 19/04*    (2006.01)
*B29C 45/14*    (2006.01)
(Continued)

(52) U.S. Cl.
CPC .... *B29C 45/14467* (2013.01); *B29C 45/0001* (2013.01); *B65D 19/04* (2013.01);
(Continued)

(58) Field of Classification Search
CPC ........... B65D 2519/00034; B65D 2519/00069; B65D 2519/00104; B65D 2519/00268
(Continued)

(56) References Cited

U.S. PATENT DOCUMENTS 3,330,228 A * 7/1967 Donnelly ........... B65D 19/0012
                                                 108/57.27
3,511,191 A * 5/1970 Verdi ................. B65D 19/0018
                                                 108/57.28
(Continued)

FOREIGN PATENT DOCUMENTS

CN         2443919 Y       8/2001
CN       101376438 A       3/2009
(Continued)

OTHER PUBLICATIONS

International search report of PCT Patent Application No. PCT/CN2015/097271 dated Jun. 22, 2016.
(Continued)

*Primary Examiner* — Jose V Chen

(57) ABSTRACT

A manufacturing method of a composite ribbed expanded polystyrene pallet, which includes prefabricating the base support according to the bottom shape of the body; placing the base support in a concave mold matched with the base support; placing the plural reinforcing ribs on a supporting bracket of a raised mold; forming a mold cavity; and injecting ore-expanded polystyrene particles to produce the body, meanwhile the body is combined with the base support to form the pallet; wherein the reinforcing ribs are fixed by the supporting bracket, one end of which is provided with a spring leaf configured to engage the plural reinforcing ribs, during production process, the free end of the spring leaf inserts into the process hole to fix the reinforcing ribs, after completion of forming process, the free end of the spring
(Continued)

leaf is removed together with the raised mold, while the reinforcing ribs stay inside the body.

7 Claims, 4 Drawing Sheets

(51) Int. Cl.
*B29C 45/00* (2006.01)
*B29K 105/04* (2006.01)
*B29L 31/00* (2006.01)

(52) U.S. Cl.
CPC .... *B29K 2105/048* (2013.01); *B29K 2225/06* (2013.01); *B29L 2031/7178* (2013.01); *B65D 2519/00034* (2013.01); *B65D 2519/00069* (2013.01); *B65D 2519/00139* (2013.01); *B65D 2519/00268* (2013.01); *B65D 2519/00338* (2013.01); *B65D 2519/00467* (2013.01)

(58) Field of Classification Search
USPC ......... 108/51.11, 57.25, 57.26, 57.27, 57.28, 108/57.34
See application file for complete search history.

(56) References Cited

U.S. PATENT DOCUMENTS

| | | | | | |
|---|---|---|---|---|---|
| 3,581,681 | A | * | 6/1971 | Newton | B65D 19/0018 108/57.28 |
| 3,719,157 | A | * | 3/1973 | Arcocha | B65D 19/004 108/57.25 |
| 3,720,176 | A | * | 3/1973 | Munroe | B65D 19/0051 108/53.1 |
| 3,814,031 | A | * | 6/1974 | Fowler | B65D 19/004 108/57.28 |
| 3,814,778 | A | * | 6/1974 | Hashimoto | B29C 41/04 108/57.28 |
| 3,880,092 | A | * | 4/1975 | Seeber | B65D 19/0016 108/57.28 |
| 3,915,098 | A | * | 10/1975 | Nania | B29C 44/1266 108/57.28 |
| 4,879,956 | A | * | 11/1989 | Shuert | B65D 19/0018 108/52.1 |
| 5,123,359 | A | * | 6/1992 | DelBalso | B65D 19/0016 108/55.1 |
| 5,476,048 | A | * | 12/1995 | Yamashita | B65D 19/0012 108/51.11 |
| 5,551,353 | A | * | 9/1996 | Fiedler | B29D 99/001 108/51.3 |
| 5,687,652 | A | * | 11/1997 | Ruma | B65D 19/0012 108/57.25 |
| 5,791,262 | A | * | 8/1998 | Knight | B65D 19/0012 108/57.25 |
| 6,758,148 | B2 | * | 7/2004 | Torrey | B65D 19/0004 108/51.11 |
| 6,962,115 | B2 | * | 11/2005 | Markling | B29C 49/20 108/57.25 |
| 8,181,580 | B2 | * | 5/2012 | Roth | B65D 19/0073 108/57.25 |
| 8,567,324 | B1 | * | 10/2013 | Paradis | B65D 19/0012 108/51.3 |
| 8,991,322 | B2 | * | 3/2015 | Dubois | B65D 1/48 108/57.16 |
| 2009/0241461 | A1 | * | 10/2009 | Linares | B65D 19/0038 52/592.1 |
| 2012/0079966 | A1 | * | 4/2012 | Huang | B32B 7/12 108/57.25 |
| 2013/0133557 | A1 | * | 5/2013 | Yoshinaga | B29C 44/128 108/57.25 |

FOREIGN PATENT DOCUMENTS

| | | |
|---|---|---|
| CN | 202414322 U | 9/2012 |
| CN | 202468610 U | 10/2012 |
| CN | 102910343 A | 2/2013 |

OTHER PUBLICATIONS

1st Office Action of counterpart Chinese Patent Application No. 201510605561.9 dated Nov. 2, 2016.
2nd Office Action of counterpart Chinese Patent Application No. 201510605561.9 dated Apr. 25, 2017.

\* cited by examiner

COMPOSITE RIBBED EXPANDED POLYSTYRENE PALLET AND MANUFACTURING METHOD THEREOF

TECHNICAL FIELD

The present invention relates to the technical field of polystyrene pallet, particularly a composite ribbed expanded polystyrene pallet and a manufacturing method thereof.

BACKGROUND ART

In the industry transportation, the pallet is one of essential transport tools. At present, the pallets in the market are usually made of iron, wood or plastic. The iron pallet has heavy weight and the transportation costs are increased. Although the wooden pallet has lighter weight, it is prone to absorbing moisture and decay and has shorter service life. The injection molding plastic pallet also has heavy weight and higher cost. The foaming plastic pallet has light weight, however, its bearing strength is lower than that of iron pallets or wooden pallets. The ribbed expanded polystyrene pallet of the present invention has the advantages of light weight and high strength due to the provision of reinforced ribs. Therefore, it can achieve the effects of saving resources and reducing logistics costs.

CONTENTS OF INVENTION

The major technical problem which the present invention seeks to solve is to provide a composite ribbed expanded polystyrene pallet and a manufacturing method thereof, wherein the body is made of light-weight polystyrene, the surface is covered with a base support of high-strength engineering plastic film, and reinforcing ribs are additionally arranged inside the body through special process. The pallet of the present invention has good load bearing performance, economy and practicability. The logistics cost also can be reduced greatly. Therefore, the composite ribbed expanded polystyrene pallet and the manufacturing method thereof have broad market prospects in popularization.

In order to solve above technical problem, the present invention provides a composite ribbed expanded polystyrene pallet and a manufacturing method thereof, wherein the pallet comprises a body and a base support, the base support clads the sides and bottom of the body, said body is made of expanded polystyrene, said comprises a pallet platform and plural supporting feet, said plural supporting feet are arranged on the bottom of said pallet platform and form a whole piece with the platform, a plurality of reinforcing ribs are parellel provided inside the pallet platform, said plural reinforcing ribs are respectively arranged corresponding to said plural supporting feet.

In a preferred embodiment of the present invention, said base support includes side panels and a base body matched with the bottom shape of said pallet platform, said side panels are provided inside the sides of the body for preventing liquid seeping in.

In a preferred embodiment of the present invention, the height of said side panel is less than the thickness of the body.

In a preferred embodiment of the present invention, said base support is made of high-strength engineering plastic film.

In a preferred embodiment of the present invention, plural process holes are provided on the plural reinforcing ribs.

In a preferred embodiment of the present invention, said plural reinforcing ribs could be "I" shape, "T" shape or "L" shape.

In a preferred embodiment of the present invention, said plural reinforcing ribs are made of engineering plastics.

In a preferred embodiment of the present invention, said manufacturing method of a composite ribbed expanded polystyrene pallet comprises following steps:

(1) prefabricating a base support of high-strength engineering plastic film according to the bottom shape of said body;

(2) placing said base support in a concave mold which is matched with said base support;

(3) placing said plural reinforcing ribs on a supporting bracket of a raised mold;

(4) utilizing a mold closing apparatus to assembly the raised mold with plural reinforcing ribs and said concave mold to form a mold cavity;

(5) injecting pre-expanded polystyrene particles into the mold cavity to produce said body, meanwhile said body is combined with said base support to form said composite ribbed expanded polystyrene pallet.

In a preferred embodiment of the present invention, in said step (3), said plural reinforcing ribs are fixed by the reinforcing rib supporting bracket, one end of said reinforcing rib supporting bracket is fixed to said raised mold, and the other end is provided with a spring leaf against said reinforcing ribs, the free end of said spring leaf is curved, during the production process, said spring leaf of said reinforcing rib supporting bracket inserts into the process hole of said reinforcing ribs to fix said reinforcing rib by its curved end, after the completion of forming process, said spring leaf of said reinforcing rib supporting bracket has an elastic deformation and is capable of exiting from the processing hole together with said raised mold, while said plural reinforcing ribs stay inside said body.

The beneficial effects of the present invention are as follows: the present invention utilizes light-weight polystyrene to make the body, the surface is covered with a base support of high-strength engineering plastic film, and reinforcing ribs are additionally arranged inside the body through special process. The pallet of the present invention has good load bearing performance, economy and practicability. The logistics cost also can be reduced greatly. Therefore, the composite ribbed expanded polystyrene pallet and the manufacturing method thereof have broad market prospects in popularization.

BRIEF DESCRIPTION OF DRAWINGS

In order to introduce the technical solutions of the present invention embodiments more clearly, the foregoing description is briefly given with reference to the accompanying drawings to explain embodiments. It is obvious that following drawings are only examples of the present invention, those skilled in the art would conceive other figures according to these drawings with no need for any inventive effort.

DESCRIPTION OF EMBODIMENTS

The solutions of embodiments of the present invention will be described clearly and completely as follows. It will of course be realised that the described embodiments are only a limited part of the present invention, but not all of the examples. With reference to the embodiments of the present invention, all other modifications and variations thereto as would be apparent to persons skilled in the art are deemed to fall within the protection scope of this invention.

Figure 1:
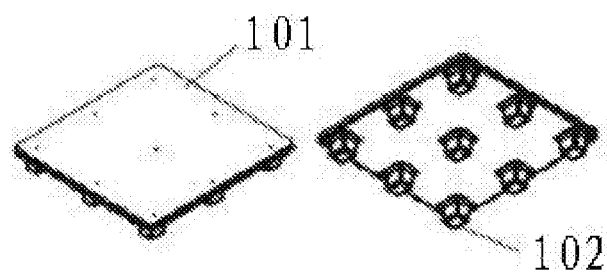
FIG. 1 is a structural schematic view showing the body of a composite ribbed expanded polystyrene pallet according to a preferred embodiment of the present invention.
Figure 2:
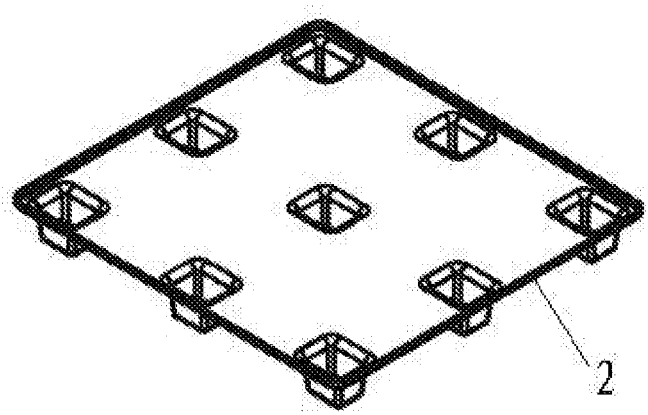
FIG. 2 is a structural schematic view showing the base support of a composite ribbed expanded polystyrene pallet according to a preferred embodiment of the present invention.
Figure 3:
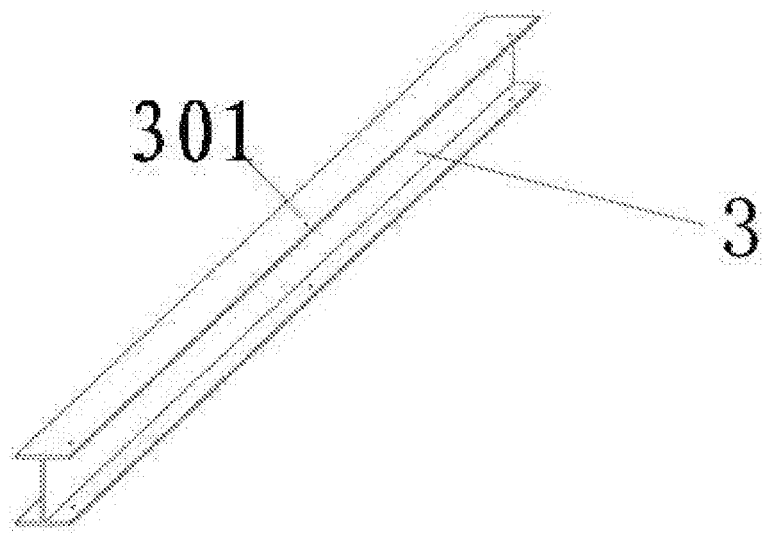
FIG. 3 is a structural schematic view showing the reinforcing ribs of a composite ribbed expanded polystyrene pallet according to a preferred embodiment of the present invention.
Figure 4:
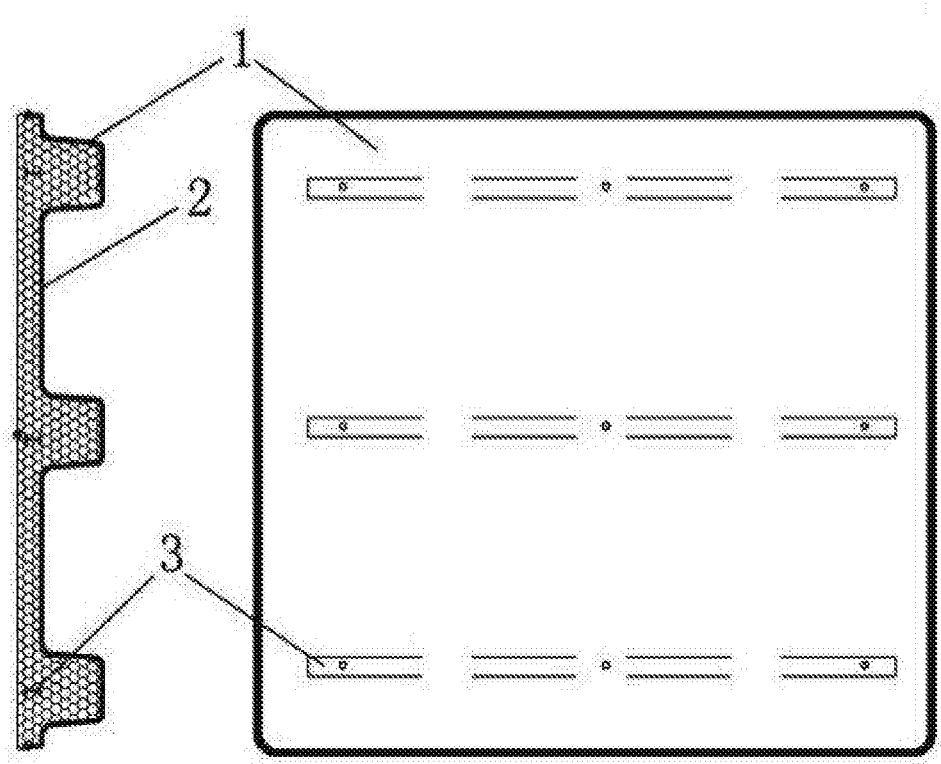
FIG. 4 is a structural schematic view showing the position where the reinforcing ribs locate in the body according to a preferred embodiment of the present invention.
Figure 5:
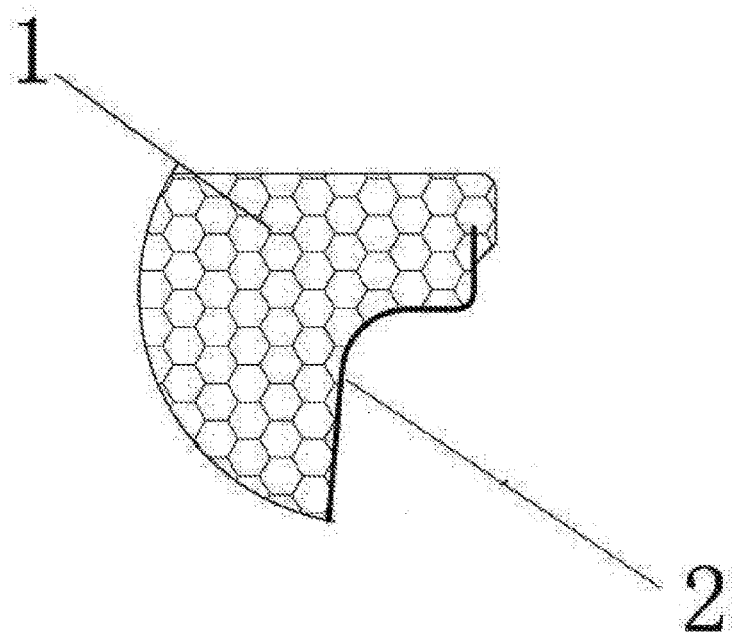
FIG. 5 is a local structural schematic view showing the engagement between the base support and the body sides according to a preferred embodiment of the present invention.
Figure 6:
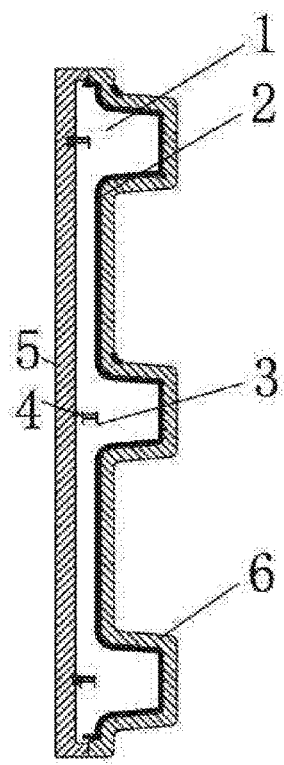
FIG. 6 is a structural schematic view showing the base support and the body located in a mould according to a preferred embodiment of the present invention.
Figure 7:
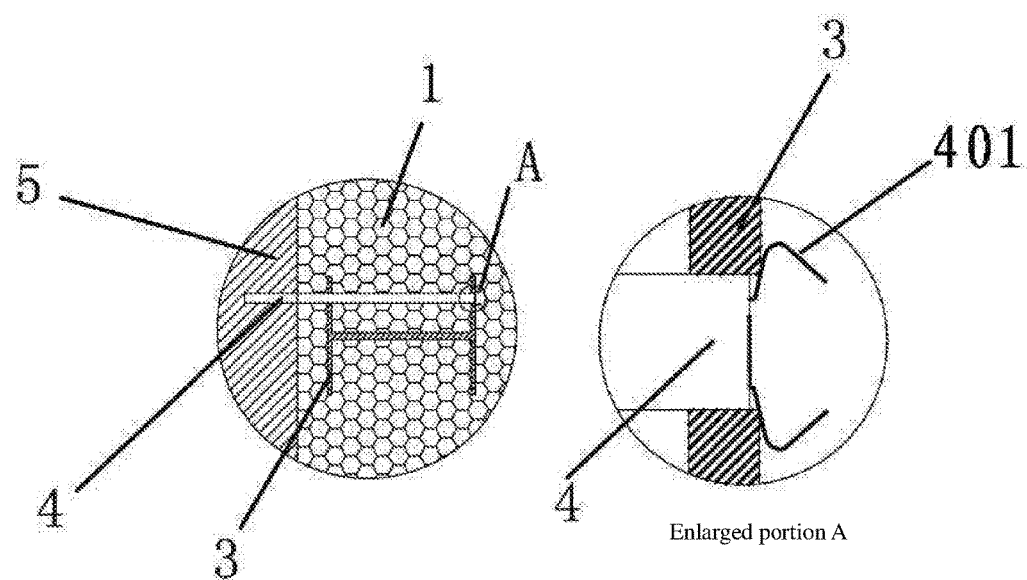
FIG. 7 is a structural schematic view showing a supporting bracket for the reinforcing ribs according to a preferred embodiment of the present invention.

Reference will now be made to FIGS. 1 to 7 which illustrate embodiments of the invention.

A composite ribbed expanded polystyrene pallet and a manufacturing method thereof are provided. The pallet includes a body 1 and a base support 2.

Said base support 2 clads the sides and bottom of the body 1. The base support 2 is matched with the body 1 and tightly combined with the body 1. Said body 1 is made of expanded polystyrene, which can increase the beauty of the product and be convenient for users for different purposes as well. Said body 1 comprises a pallet platform 101 and a plurality of supporting feet 102. The top of said pallet platform 101 is a planar surface. Said plural supporting feet 102 and said pallet platform 101 form as a single piece. Said plural supporting feet 102 are arranged on the bottom of said pallet platform 101. A plurality of reinforcing ribs 3 are parellel provided inside the pallet platform 101. Said plural reinforcing ribs 3 are respectively arranged corresponding to said plural supporting feet and form a layout of a square shape or a pound sign shape (#).

Preferably, said base support 2 includes side panels and a base body matched with the bottom shape of said pallet platform 101. Said side panels are provided inside the sides of the body 1 for preventing liquid seeping in, therefore it is evitable to let water or other liquid seep into the gap between the base support 2 and the body 1 to affect the bonding strength between them. Furthermore, declading can be avoided effectively, so that the strength of the pallet would be guaranteed.

Preferably, the height of said side panel is less than the thickness of the body 1.

Preferably, said base support 2 is made of high-strength engineering plastic film.

Preferably, a plurality of process holes are provided on the plural reinforcing ribs 3.

Preferably, the cross section of said plural reinforcing ribs 3 could be "I" shape, "T" shape or "L" shape.

Preferably, said plural reinforcing ribs 3 are made of engineering plastics.

Preferably, said manufacturing method of the composite ribbed expanded polystyrene pallet comprises following steps:
(1) Prefabricating a base support of high-strength engineering plastic film according to the bottom shape of said body 1;
(2) Placing said base support 2 in a concave mold 6 which is matched with said base support 2;
(3) Placing said plural reinforcing ribs 3 on a supporting bracket of a raised mold 5;
(4) Utilizing a mold closing apparatus to assembly the raised mold 5 with plural reinforcing ribs 3 and said concave mold 6 to form a mold cavity;
(5) Injecting pre-expanded polystyrene particles into the mold cavity to produce said body, meanwhile said body 1 is combined with said base support 2 to form said composite ribbed expanded polystyrene pallet. Preferably, in said step (3), said plural reinforcing ribs 3 are fixed by the reinforcing rib supporting bracket 4. One end of said reinforcing rib supporting bracket 4 is fixed to said raised mold 5, and the other end is provided with a spring leaf 401 against said reinforcing ribs 3. The free end of said spring leaf 401 is curved. During the production process, said spring leaf 401 of said reinforcing rib supporting bracket 4 inserts into the process hole 301 of said reinforcing ribs 3 to fix said reinforcing rib 3 by its curved end. After the completion of forming process, said spring leaf 401 of said reinforcing rib supporting bracket 4 has an elastic deformation and is capable of exiting from the processing hole together with said raised mold 5, while said plural reinforcing ribs 3 stay inside said body 1.

The beneficial effects of the composite ribbed expanded polystyrene pallet and the manufacturing method thereof according to the present invention are as follows.

Due to the body is made of polystyrene, the weight could be lighter. The surface is covered with a base support of high-strength engineering plastic film, and reinforcing ribs are additionally arranged inside the body through special process. Therefore it has good load bearing performance. The product is economical and practical. The logistics cost also can be reduced greatly. The invention has advantages of simple production process, high production efficiency, low product costs, light weight and high bearing strength. The weight of a pallet is less than 5 kilograms, which make it especially suitable for the application in aviation logistics due to its economy and practicability.

It should be noticed that above embodiments are only examples of the present invention but not limitations of patent scope of this invention. All other modifications and variations made according to the description of the present invention, or applications used in other relevant technical fields directly or indirectly, should be considered as falling within the patent protection scope of this invention.

What is claimed is:

1. A manufacturing method of a composite ribbed expanded polystyrene pallet, wherein the composite ribbed expanded polystyrene pallet comprises a body and a base support, said base support clads sides and bottom of the body, said body is made of expanded polystyrene, said body comprises a pallet platform and plural supporting feet, said plural supporting feet are arranged on bottom of said pallet platform and form a whole piece with the pallet platform, plural reinforcing ribs are parellel provided inside the pallet platform, said plural reinforcing ribs are respectively arranged corresponding to said plural supporting feet;

wherein the manufacturing method of the composite ribbed expanded polystyrene pallet comprises following steps:
(1) prefabricating said base support of high-strength engineering plastic film according to a shape of the bottom of said body;
(2) placing said base support in a concave mold which is matched with said base support;
(3) placing said plural reinforcing ribs on a supporting bracket of a raised mold;
(4) utilizing a mold closing apparatus to assembly the raised mold with plural reinforcing ribs and said concave mold to form a mold cavity; and
(5) injecting pre-expanded polystyrene particles into the mold cavity to produce said body, meanwhile said body is combined with said base support to form said composite ribbed expanded polystyrene pallet;
wherein in said step (3), said plural reinforcing ribs are fixed by the supporting bracket, one end of said supporting bracket is fixed to said raised mold, and another end of said supporting bracket is provided with a spring leaf, the spring leaf is configured to engage said plural reinforcing ribs, the free end of said spring leaf is curved, during production process, the free end of said spring leaf of said supporting bracket is elastically shrunken by compression and inserts into the process hole of said reinforcing ribs, and the free end of said spring leaf is elastically expanded upon being inserted into the process hole of said reinforcing ribs to fix said reinforcing ribs by the free end, after completion of forming process, the free end of said spring leaf of said supporting bracket is pulled out from the processing hole and removed together with said raised mold, while said plural reinforcing ribs stay inside said body, wherein the free end of said spring leaf of said supporting bracket undergoes elastic shrinking when being pulled out from the processing hole of said reinforcing ribs.

2. The manufacturing method of the composite ribbed expanded polystyrene pallet according to claim 1, wherein said base support comprises side panels and a base body matched with a shape of the bottom of said pallet platform, said side panels are provided inside the sides of the body for preventing liquid seeping in.

3. The manufacturing method of the composite ribbed expanded polystyrene pallet according to claim 2, wherein a height of said side panels is less than a thickness of the body.

4. The manufacturing method of the composite ribbed expanded polystyrene pallet according to claim 1, wherein said base support is made of high-strength engineering plastic film.

5. The manufacturing method of the composite ribbed expanded polystyrene pallet according to claim 1, wherein plural process holes are provided on the plural reinforcing ribs.

6. The manufacturing method of the composite ribbed expanded polystyrene pallet according to claim 1, wherein said plural reinforcing ribs are of "I" shape, "T" shape or "L" shape.

7. The manufacturing method of the composite ribbed expanded polystyrene pallet according to claim 1, wherein said plural reinforcing ribs are made of engineering plastics.

* * * * *